US010618669B2

(12) United States Patent
Fink

(10) Patent No.: US 10,618,669 B2
(45) Date of Patent: Apr. 14, 2020

(54) METHOD OF DETERMINING AIRCRAFT GROUND SPEED

(71) Applicant: GOODRICH CORPORATION, Charlotte, NC (US)

(72) Inventor: Thomas Fink, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 191 days.

(21) Appl. No.: 15/787,611

(22) Filed: Oct. 18, 2017

(65) Prior Publication Data

US 2019/0112070 A1    Apr. 18, 2019

(51) Int. Cl.
| | | |
|---|---|---|
| *B64D 43/02* | (2006.01) | |
| *B60T 8/171* | (2006.01) | |
| *G01P 3/56* | (2006.01) | |
| *G01P 3/00* | (2006.01) | |
| *G01P 21/02* | (2006.01) | |
| *B60T 8/17* | (2006.01) | |
| *B64C 25/42* | (2006.01) | |
| *B64C 25/34* | (2006.01) | |

(52) U.S. Cl.
CPC .............. *B64D 43/02* (2013.01); *B60T 8/171* (2013.01); *B60T 8/1703* (2013.01); *G01P 3/00* (2013.01); *G01P 3/56* (2013.01); *G01P 21/02* (2013.01); *B60T 2250/04* (2013.01); *B64C 25/34* (2013.01); *B64C 25/426* (2013.01)

(58) Field of Classification Search
CPC .... B60T 2250/04; B60T 8/1703; B64D 43/02
See application file for complete search history.

(56) References Cited

U.S. PATENT DOCUMENTS

| | | | |
|---|---|---|---|
| 3,520,575 A | 7/1970 | Steigerwald | |
| 4,410,153 A * | 10/1983 | Romero | ................... B64C 25/46 244/111 |
| 9,139,293 B2 | 9/2015 | Griffith | |
| 9,280,155 B2 | 3/2016 | Cox et al. | |
| 9,457,896 B2 | 10/2016 | De Mers et al. | |
| 2015/0012195 A1* | 1/2015 | Georgin | ................... B64C 25/42 701/70 |
| 2015/0142217 A1* | 5/2015 | Metzger, Jr. | .......... B60T 8/1763 701/3 |
| 2017/0057624 A1 | 3/2017 | Lo et al. | |
| 2017/0089939 A1 | 3/2017 | Azuma et al. | |
| 2017/0158316 A1* | 6/2017 | Sharpe | ................... B64C 25/505 |
| 2019/0054826 A1* | 2/2019 | Greenwood | ............ B60L 3/102 |
| 2019/0176966 A1* | 6/2019 | Eddy | ....................... B64C 13/16 |

FOREIGN PATENT DOCUMENTS

EP        2821301        1/2015

OTHER PUBLICATIONS

European Patent Office, European Search Report dated Mar. 22, 2019 in Application No. 18200239.4.

* cited by examiner

*Primary Examiner* — Michael J Dalbo
(74) *Attorney, Agent, or Firm* — Snell & Wilmer, L.L.P.

(57) ABSTRACT

A method for determining actual aircraft ground speed may comprise receiving a reference ground speed value; receiving a wheel speed value of a nose wheel of an aircraft; comparing the wheel speed value of the nose wheel and the reference ground speed value; and/or determining the actual aircraft ground speed based on the reference ground speed value and the wheel speed value.

14 Claims, 4 Drawing Sheets

METHOD OF DETERMINING AIRCRAFT GROUND SPEED

FIELD OF THE DISCLOSURE

The present disclosure relates to an aircraft. In particular, the disclosure relates to systems and methods for determining the ground speed of an aircraft.

BACKGROUND OF THE DISCLOSURE

A major input to current brake control algorithms for aircrafts is an aircraft reference speed, which may be based on an estimate of what an aircraft wheel speed would be if it was not being braked. Ideally, the aircraft reference speed equals the aircraft ground speed. However, in today's aircraft speed monitoring systems, there is generally not a direct method of determining aircraft ground speed (to use as the aircraft reference speed), because, for example, a wheel speed sensor may measure the speed of the main landing gear wheels while braking during landing. However, during braking, the main landing gear wheels may slip, and thus, the wheel speed measured by the wheel speed sensors may not accurately reflect the ground speed. As a result, the aircraft ground speeds tend to be approximations based on potentially inaccurate wheel speed measurements.

SUMMARY OF THE DISCLOSURE

In various embodiments, a method for determining aircraft ground speed may comprise receiving, by a processor, a reference ground speed value; receiving, by the processor, a wheel speed value of a nose wheel of an aircraft; comparing, by the processor, the wheel speed value of the nose wheel and the reference ground speed value; and/or determining, by the processor, the actual aircraft ground speed based on the reference ground speed value and the wheel speed value. In various embodiments, the actual aircraft ground speed may be determined to be at least one of equal to or proportional to the reference ground speed value in response to the reference ground speed value being greater than the wheel speed value. In various embodiments, the actual aircraft ground speed may be determined to be at least one of equal to or proportional to the wheel speed value in response to the wheel speed value being greater than or equal to the reference ground speed value. In various embodiments, the reference ground speed value may be based on a first wheel speed value from a first landing gear wheel and a second wheel speed value from a second landing gear wheel.

In various embodiments, the method may further comprise analyzing, by the processor, for a non-use condition prior to the determining the actual aircraft ground speed, wherein a non-use condition is a condition which prevents the processor from utilizing the wheel speed value to determine the actual aircraft ground speed. In various embodiments, the method may further comprise detecting, by the processor, non-existence of the non-use condition in response to the analyzing for the non-use condition, wherein the actual aircraft ground speed is determined to be at least one of equal to or proportional to the wheel speed value in response to the wheel speed value being greater than or equal to the reference ground speed value. In various embodiments, the method may further comprise detecting, by the processor, existence of the non-use condition in response to the analyzing for a non-use condition, wherein the actual aircraft ground speed is determined to be at least one of equal to or proportional to the reference ground speed value in response to the detection of the non-use condition.

In various embodiments, the method may further comprise receiving, by the processor, at least one of a weight signal, a wheel steering angle value, or a runway signal prior to the analyzing for the non-use condition. In various embodiments, the method may further comprise detecting, by the processor, existence of the non-use condition in response to the analyzing for the non-use condition, wherein the non-use condition may be at least one of the weight signal indicating a lack of weight on the nose wheel, the wheel steering angle value indicating that the nose wheel is not substantially in a base position, or the runway signal indicating an adverse condition on a runway.

In various embodiments, an aircraft ground speed determination system may comprise a landing gear wheel; a wheel speed monitor coupled to the landing gear wheel; a nose wheel; a nose wheel speed monitor coupled to the nose wheel; a processor in electronic communication with the wheel speed monitor and the nose wheel speed monitor; and/or a tangible, non-transitory memory configured to communicate with the processor, the tangible, non-transitory memory having instructions stored thereon that, in response to execution by the processor, cause the processor to perform operations. The operations may comprise receiving, by the processor, a reference ground speed value; receiving, by the processor, a wheel speed value of the nose wheel of an aircraft; comparing, by the processor, the wheel speed value of the nose wheel and the reference ground speed value; and/or determining, by the processor, an actual aircraft ground speed based on the reference ground speed value and the wheel speed value.

In various embodiments, the actual aircraft ground speed may be determined to be at least one of equal to or proportional to the reference ground speed value in response to the reference ground speed value being greater than the wheel speed value. In various embodiments, the actual aircraft ground speed may be determined to be at least one of equal to or proportional to the wheel speed value in response to the wheel speed value being greater than or equal to the reference ground speed value. In various embodiments, the reference ground speed value may be based on a first wheel speed value from the landing gear wheel.

In various embodiments, the operations may further comprise analyzing, by the processor, for a non-use condition prior to the determining the actual aircraft ground speed, wherein a non-use condition is a condition which prevents the processor from utilizing the wheel speed value to determine the actual aircraft ground speed. In various embodiments, the operations may further comprise detecting, by the processor, non-existence of the non-use condition in response to the analyzing for the non-use condition, wherein the actual aircraft ground speed is determined to be at least one of equal to or proportional to the wheel speed value in response to the wheel speed value being greater than or equal to the reference ground speed value. In various embodiments, the operations may further comprise detecting, by the processor, existence of the non-use condition in response to the analyzing for the non-use condition, wherein the actual aircraft ground speed is determined to be at least one of equal to or proportional to the reference ground speed value in response to the detection of the non-use condition.

In various embodiments, an aircraft may comprise a fuselage; a landing gear wheel coupled to the fuselage; a wheel speed monitor coupled to the landing gear wheel; a nose wheel coupled to the fuselage forward of the landing gear wheel; a nose wheel speed monitor coupled to the nose wheel; a processor in electronic communication with the wheel speed monitor and the nose wheel speed monitor; and/or a tangible, non-transitory memory configured to communicate with the processor, the tangible, non-transitory memory having instructions stored thereon that, in response to execution by the processor, cause the processor to perform operations. The operations may comprise receiving, by the processor, a reference ground speed value; receiving, by the processor, a wheel speed value of the nose wheel of the aircraft; comparing, by the processor, the wheel speed value of the nose wheel and the reference ground speed value; and/or determining, by the processor, an actual aircraft ground speed based on the reference ground speed value and the wheel speed value.

In various embodiments, the actual aircraft ground speed may be determined to be at least one of equal to or proportional to the reference ground speed value in response to the reference ground speed value being greater than the wheel speed value. In various embodiments, the actual aircraft ground speed may be determined to be at least one of equal to or proportional to the wheel speed value in response to the wheel speed value being greater or equal to than the reference ground speed value. In various embodiments, the operations may further comprise analyzing, by the processor, for a non-use condition prior to the determining the actual aircraft ground speed, wherein a non-use condition is a condition which prevents the processor from utilizing the wheel speed value to determine the actual aircraft ground speed.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
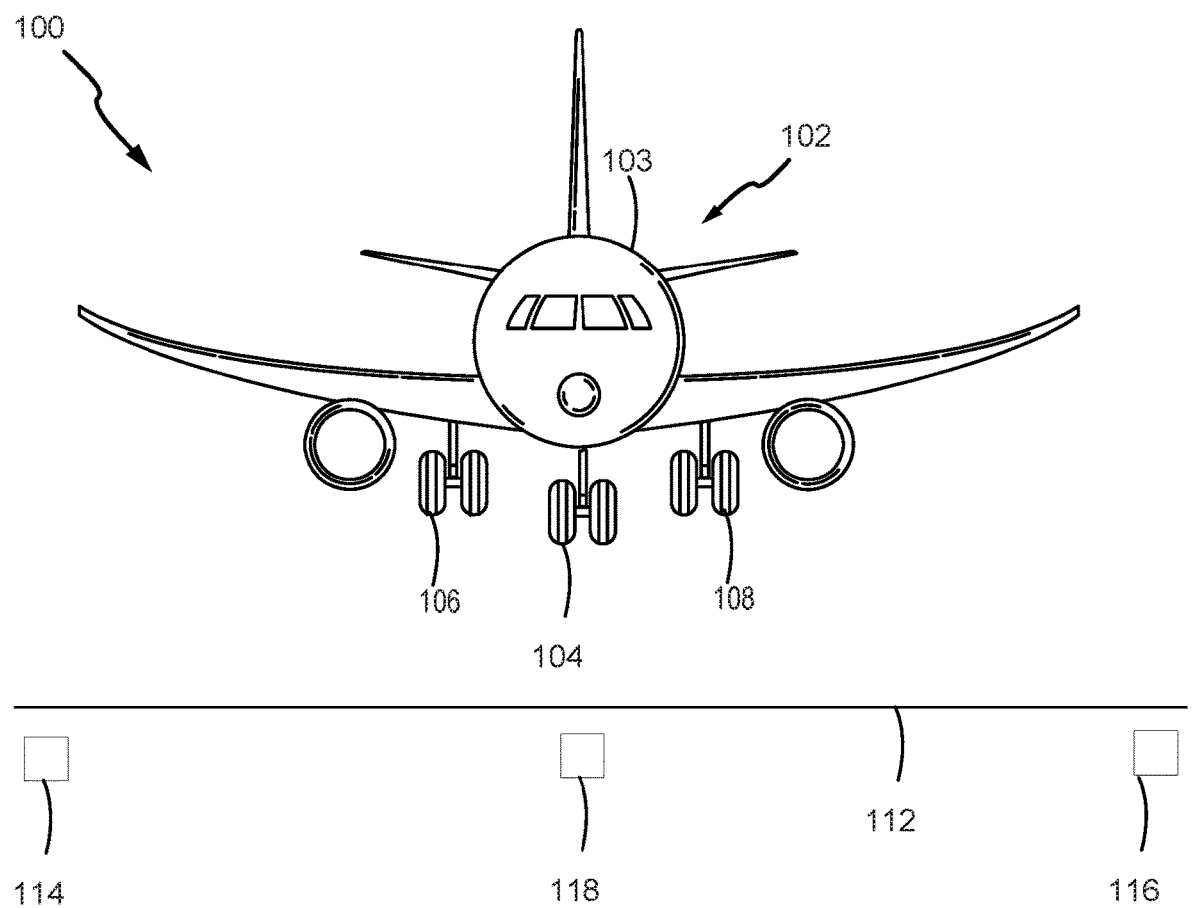
FIG. 1 shows an aircraft runway system, according to various embodiments.

FIG. 1 depicts an aircraft runway system 100 according to various embodiments. Aircraft runway system 100 includes an aircraft 102 and a runway 112. Aircraft 102 includes a fuselage 103, a nose wheel 104 coupled to fuselage 103, landing gear wheel 106 coupled to fuselage 103 aft of nose wheel 104, and landing gear wheel 108 coupled to fuselage 103 aft of nose wheel 104 (wherein "aft" means toward the tail end of aircraft 102, and "forward means toward the front of aircraft 102). Runway 112 includes sensor 114, sensor 116, and sensor 118. In various embodiments, sensor 114, sensor 116, and sensor 118 may be, for example, ice sensors positioned on runway 112 to detect whether ice is located on runway 112. In various embodiments, for example, sensor 114, sensor 116, and sensor 118 may be positioned on runway 112 to determine whether ice is located beneath, for example, nose wheel 104, landing gear wheel 106, and/or landing gear wheel 108. In various embodiments, sensor 114, sensor 116, and/or sensor 118 located on runway 112 may be triggered to provide runway information, for example, ice location information, to aircraft 102 upon landing of aircraft 102 onto runway 112. The information ascertained from sensor 114, sensor 116, and sensor 118 may be provided to aircraft 102 for use during landing of aircraft 102.

Figure 2:
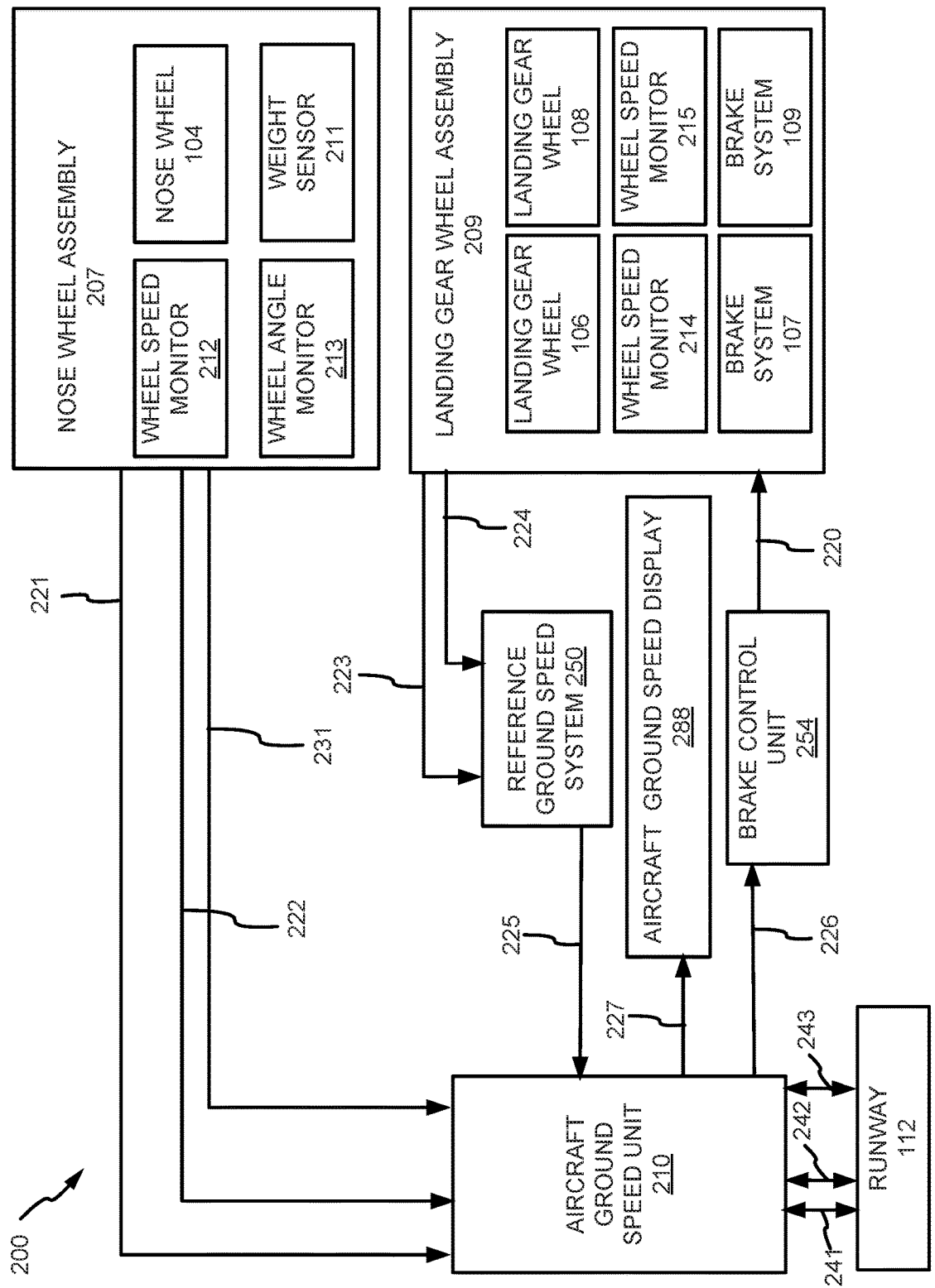
FIG. 2 is a block diagram showing an aircraft ground speed determination system, in accordance with various embodiments.

In various embodiments, during landing, aircraft 102 has an actual ground speed that may be determined by, for example, an aircraft ground speed determination system 200 (referring to momentarily and described in detail in FIG. 2). A benefit of aircraft ground speed determination system 200 is that it is able to utilize nose wheel 104 to determine an actual ground speed of aircraft 102, as opposed to an estimated aircraft ground speed. In various embodiments, the importance of utilizing nose wheel 104 to determine actual ground speed of aircraft 102 is based in part on the independence of nose wheel 104 from the braking torque and potential slippage associated with measuring the speed of a braking wheel (e.g., measuring the speed of landing gear wheel 106 and landing gear wheel 108 while braking when aircraft 102 is landing on runway 112).

FIG. 2 is a block diagram showing various system components and data flow of an aircraft ground speed determination system 200 with runway 112. Aircraft ground speed determination system 200 includes a nose wheel assembly 207, a landing gear wheel assembly 209, an aircraft ground speed unit 210, an aircraft ground speed display 288, a brake control unit 254, and a reference ground speed system 250.

In various embodiments, nose wheel assembly 207 includes a weight sensor 211, a wheel speed monitor 212, a wheel angle monitor 213, and nose wheel 104. Weight sensor 211, wheel speed monitor 212, and/or wheel angle monitor 213 may be coupled to nose wheel 104 or a component thereof. In various embodiments, landing gear wheel assembly 209 includes a wheel speed monitor 214 coupled to a landing gear wheel 106 and a wheel speed monitor 215 coupled to a landing gear wheel 108. Brake systems 107, 109 may be coupled to landing gear wheels 106, 108, respectively. In various embodiments, landing gear wheel assembly may comprise one or more landing gear wheels and/or wheel speed monitors. Weight sensor 211 may be any type of sensor capable of detecting weight applied to nose wheel 104 (in response to aircraft 102 landing on a surface, such as runway 112). Wheel speed monitor 212, wheel speed monitor 214, and/or wheel speed monitor 215 may be any type of speed sensor known in the art to ascertain the speed of an aircraft wheel.

In various embodiments, wheel angle monitor 213 may be, for example, any type of angle detector known in the art to ascertain the angle of an aircraft wheel during landing and/or taxiing of aircraft 102. In various embodiments, the angle associated with nose wheel 104 may be represented by a wheel steering angle value 222 and may, for example, be the angle of the nose wheel 104 while aircraft 102 is turning. Wheel steering angle value 222 may be referenced from or relative to the base position of nose wheel 104. The base position of nose wheel 104 may be defined as the forward position of nose wheel 104 relative to the central axis of the fuselage 103 of aircraft 102, which would cause aircraft 102 to travel in a straight line.

In various embodiments, nose wheel assembly 207 may be electronically coupled to (i.e., in electronic communication with) aircraft ground speed unit 210. Nose wheel assembly 207 may transmit a weight signal 231 (reflecting a weight applied to nose wheel 104 detected by weight sensor 211), a wheel speed value 221 (reflecting a wheel speed of nose wheel 104 detected by wheel speed monitor 212), and/or a wheel steering angle value 222 (reflecting an angle of nose wheel 104 relative to the base position of nose wheel 104 detected by wheel angle monitor 213) to aircraft ground speed unit 210. Landing gear wheel assembly 209 may be electronically coupled to (i.e., in electronic communication with) reference ground speed system 250. Landing gear wheel assembly 209 may transmit a first wheel speed value 223 (reflecting a wheel speed of landing gear wheel 106 detected by wheel speed monitor 214) and/or a second wheel speed value 224 (reflecting a wheel speed of landing gear wheel 108 detected by wheel speed monitor 215). Landing gear wheel assembly 209 is coupled to brake control unit 254 to receive a brake control signal 220.

In various embodiments, aircraft ground speed unit 210 is coupled to reference ground speed system 250 to receive a reference ground speed value 225. Aircraft ground speed unit 210 is coupled to aircraft ground speed display 288 to provide an actual aircraft ground speed 227 for visual display. Aircraft ground speed unit 210 is coupled to brake control unit 254 to provide a brake adjustment signal 226. Aircraft ground speed unit 210, reference ground speed system 250, aircraft ground speed display 288, and brake control unit 254 may include one or more processors and one or more tangible, non-transitory memories and be capable of storing instructions. The processor(s) may be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, with reference to FIG. 1 and FIG. 2, during landing of aircraft 102, nose wheel 104 touches down onto runway 112. In response, weight sensor 211 may detect a weight being applied to nose wheel 104. Further in response to nose wheel 104 touching down onto runway 112, wheel speed monitor 212 of aircraft ground speed determination system 200 may detect the speed of nose wheel 104 (i.e., wheel speed value 221). In various embodiments, wheel speed monitor 212 may transmit wheel speed value 221 of nose wheel 104 to aircraft ground speed unit 210. Weight sensor 211 may transmit weight signal 231 to aircraft ground speed unit 210 reflecting that a weight is applied to nose wheel 104. In various embodiments, weight signal 231 may detect simply whether or not there is a weight applied to nose wheel 104 (i.e., nose wheel 104 is on the ground), and/or a duration that the weight is applied to nose wheel 104.

Reference ground speed system 250 may receive a first wheel speed value 223 and a second wheel speed value 224 from wheel speed monitor 214 and wheel speed monitor 215, respectively. Reference ground speed system 250 may calculate a reference ground speed value 225 based on first wheel speed value 223 and a second wheel speed value 224 (e.g., by calculating an average speed between first wheel speed value 223 and a second wheel speed value 224). Reference ground speed system 250 may transmit reference ground speed value 225 to aircraft ground speed unit 210. In various embodiments, aircraft ground speed unit 210 may determine an actual aircraft ground speed 227 based on wheel speed value 221 and/or reference ground speed value 225, as discussed herein.

In various embodiments, aircraft ground speed unit 210 may determine actual aircraft ground speed 227 by comparing wheel speed value 221 of nose wheel 104 to reference ground speed value 225. In various embodiments, as part of the comparison, aircraft ground speed unit 210 determines if wheel speed value 221 is greater than or equal to reference ground speed value 225. If wheel speed value 221 is greater than or equal to reference ground speed value 225, aircraft ground speed unit 210 may determine actual aircraft ground speed 227 to be equal to wheel speed value 221. In various embodiments, determining that actual aircraft ground speed 227 is equal to wheel speed value 221 may further comprise (or require) determining and/or recognizing by aircraft ground speed unit 210 that a weight is applied to nose wheel 104. Such a weight determination may simply require that there is a weight detected applied to nose wheel 104 (e.g., indicating that aircraft 102 has touched down on runway 112), and/or that the weight applied to nose wheel 104 was applied for a predetermined duration (e.g., to make sure the aircraft is not bouncing after touching down onto runway 112). In various embodiments, determining that actual aircraft ground speed 227 is equal to wheel speed value 221 may further comprise (or require) determining and/or recognizing by aircraft ground speed unit 210 that nose wheel 104 is substantially in the base position (as used in this context only, the term "substantially" means plus or minus three degrees from the base position), as measured by wheel angle monitor 213. If nose wheel 104 is not substantially in the base position (causing aircraft 102 to turn), wheel speed value 221 may not accurately reflect actual aircraft ground speed 227. In summary, aircraft ground speed unit 210 may determine that actual aircraft ground speed 227 is equal to wheel speed value 221 if wheel speed value 221 is greater than reference ground speed value 225, weight signal 231 reflects a weight applied to nose wheel 104 (and in some cases, for a determined duration), and/or that nose wheel 104 is substantially in the base position. In various embodiments, if wheel speed value 221 is less than reference ground speed value 225, no weight is applied to nose wheel 104 (or the weight applied has taken place for an insufficient duration), and/or nose wheel 104 is not substantially in the base position, aircraft ground speed unit 210 may determine actual aircraft ground speed 227 to be equal to reference ground speed value 225.

In various embodiments, runway 112 is in wireless communication with aircraft 102 via sensor 114, sensor 116, and sensor 118 to provide information to aircraft ground speed unit 210. In various embodiments, for example, sensor 114, sensor 116, and/or sensor 118, may be in wireless communication with aircraft 102 via runway signals 241, signals 242, and signals 243, respectively. Sensor 114, sensor 116, and/or sensor 118 may be positioned to provide an ice location signal/s to aircraft ground speed unit 210 of aircraft 102 indicative of whether ice is located on runway 112 beneath, nose wheel 104, landing gear wheel 106, and/or landing gear wheel 108 of aircraft 102.

The information provided via, for example, runway signals 241, 242, and 243 may be used by aircraft ground speed unit 210 as, for example, a non-use condition of nose wheel 104. A non-use condition may be a condition potentially causing wheel speed value 221 to inaccurately reflect the actual ground speed of aircraft 102. Therefore, a non-use condition may be a condition which prevents aircraft ground speed unit 210 from utilizing wheel speed value 221 in determining actual aircraft ground speed 227. For example, nose wheel 104 sliding on ice (the non-use condition in this example) may cause the wheel speed value 221 to be unequal to the actual ground speed of aircraft 102. Therefore, wheel speed value 221 of nose wheel 104, as detected by wheel speed monitor 212, may not be used by aircraft ground speed unit 210 to determine actual aircraft ground speed 227. Other non-use conditions may be a lack of weight applied to nose wheel 104 or a weight applied to nose wheel 104 for an insufficient duration (as detected by weight sensor 211), nose wheel 104 not being disposed substantially in the base position (as detected by wheel angle monitor 213), wheel speed value 221 of nose wheel 104 being about 20% faster than landing gear wheel 106, landing gear wheel 108, and/or reference ground speed value 225 (as used in this context only, "about" means plus or minus 5%) (may indicate a blown tire on a main landing gear wheel), failure of wheel speed monitor 212, and/or the like.

In response to detecting a non-use condition, aircraft ground speed unit 210 may use the reference ground speed value 225 as actual aircraft ground speed 227 (i.e., aircraft ground speed unit 210 may determine that actual aircraft ground speed 227 is equal to the reference ground speed value 225). In various embodiments, when for example, wheel speed value 221 is less than reference ground speed value 225, wheel speed value 221 may not be used as, or to calculate, actual aircraft ground speed 227 because, for example, nose wheel 104 may have not reached the full speed of aircraft 102 or may be exposed to a non-use condition. For example, nose wheel 104 may be affected by non-use conditions such as, for example, ice on runway 112 and/or ice on nose wheel 104. Thus, the rationale to use reference ground speed value 225 as the actual aircraft ground speed 227 may be based on, for example, the condition of nose wheel 104 or runway 112.

In various embodiments, aircraft ground speed unit 210 may determine whether nose wheel 104 is undergoing the non-use condition by using, for example, an ice sensor located on nose wheel 104 or sensors 114, 116, and/or 118 located on, for example, runway 112. The ice sensors located on nose wheel 104 or runway 112 maybe, for example, any type of ice sensor known in the art that is capable of communicating with aircraft 102.

Figure 3:
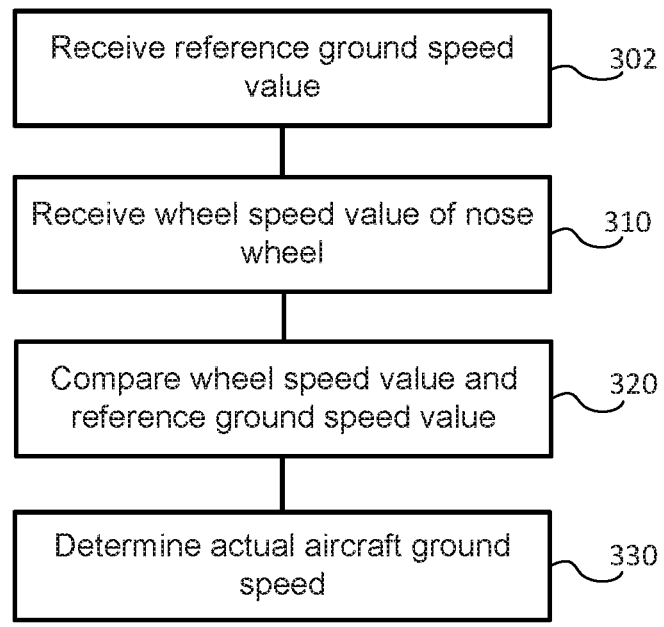
FIG. 3 is a diagram illustrating a process flow for determining aircraft ground speed, in accordance with various embodiments.

With reference to FIG. 3, a method 300 for determining aircraft ground speed is illustrated according to various embodiments. With combined reference to FIGS. 1-3, in various embodiments, aircraft ground speed unit 210 may receive a reference ground speed value 225 (step 302) of aircraft 102 from reference ground speed system 250. In various embodiments, reference ground speed value 225 may be calculated by reference ground speed system 250 based on first wheel speed value 223 from first landing gear wheel 106 and second wheel speed value 224 from second landing gear wheel 108 (e.g., by taking the average of first wheel speed value 223 and second wheel speed value 224).

In various embodiments, aircraft ground speed unit 210 may receive wheel speed value 221 of nose wheel 104 (step 310). In various embodiments, aircraft ground speed unit 210 may compare wheel speed value 221 of nose wheel 104 and reference ground speed value 225 (step 320). Based on the comparison, aircraft ground speed unit 210 may determine actual aircraft ground speed 227 (step 330). In response to wheel speed value 221 of nose wheel 104 being greater than or equal to reference ground speed value 225, aircraft ground speed unit 210 may determine that actual aircraft ground speed 227 is equal (or proportional to) to wheel speed value 221. Conversely, in response to wheel speed value 221 of nose wheel 104 being less than reference ground speed value 225, aircraft ground speed unit 210 may determine that actual aircraft ground speed 227 is equal (or proportional to) to reference ground speed value 225.

Figure 4:
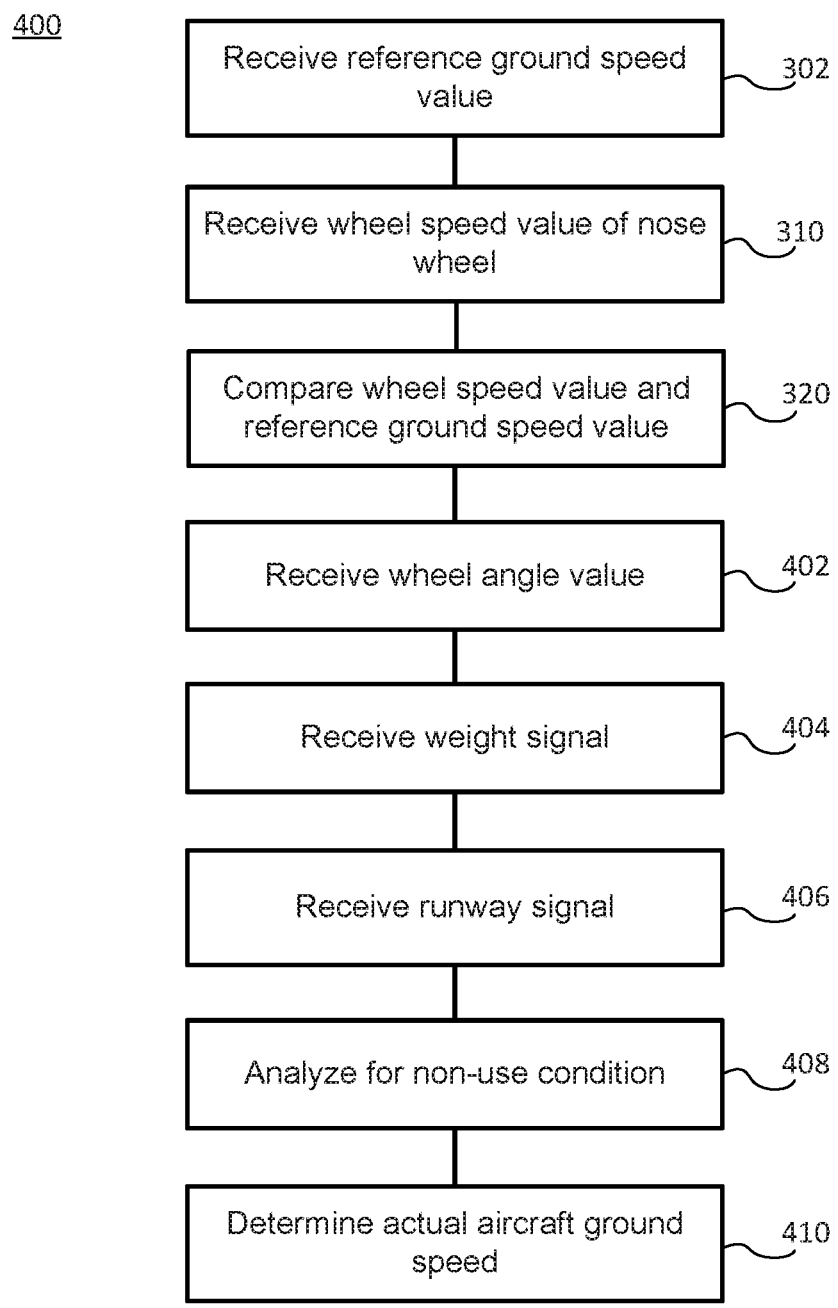
FIG. 4 is a diagram illustrating another process flow for determining aircraft ground speed, in accordance with various embodiments.

With reference to FIG. 4, a method 400 for determining aircraft ground speed is illustrated, according to various embodiments. With combined reference to FIGS. 1-2 and 4, similar to method 300 in FIG. 3, aircraft ground speed unit 210 may receive reference ground speed value 225 (step 302) and wheel speed value 221 of nose wheel 104 (step 310), and compare reference ground speed value 225 and wheel speed value 221 (step 320). In various embodiments, aircraft ground speed unit 210 may receive wheel steering angle value 222 (step 402) reflecting the angle of nose wheel 104 relative to its base position. In various embodiments, aircraft ground speed unit 210 may receive weight signal 231 (step 404) indicating whether a weight is applied to nose wheel 104, or the duration for which a weight has been applied to nose wheel 104 (e.g., indicating that, or for how long, aircraft 102 has been in contact with runway 112). In various embodiments, aircraft ground speed unit 210 may receive a runway signal (step 406) (e.g., runway signal 241, 242, and/or 243), which may indicate the presence of an adverse condition on the runway (e.g., ice, water, or the like, which may cause nose wheel 104 to spin disproportionately to the actual ground speed of aircraft 102).

In various embodiments, aircraft ground speed unit 210 may analyze the received information for a non-use condition (step 408). For example, a non-use condition may be detected by aircraft ground speed unit 210 in response to wheel steering angle value 222 reflecting that nose wheel 104 is in a position that is not substantially the base position (i.e., creating an angle relative to the base position that is greater than three degrees). As another example, a non-use condition may be detected by aircraft ground speed unit 210 in response to weight signal 231 indicating that there is no weight applied to nose wheel 104, and/or a weight has been applied for an insufficient duration. As yet another example, a non-use condition may be detected by aircraft ground speed unit 210 in response to a runway signal indicating an adverse condition on runway 112 (e.g., ice, water, or the like). As yet another example, a non-use condition may be detected by aircraft ground speed unit 210 in response to wheel speed value 221 being about 20% faster than landing gear wheel 106, landing gear wheel 108, and/or reference ground speed value 225. As yet another example, a non-use condition may be detected by aircraft ground speed unit 210 in response to wheel speed monitor malfunctioning.

In various embodiments, aircraft ground speed unit 210 may determine actual aircraft ground speed 227 (step 410) based on the comparison of step 320 and the analysis of 408. If reference ground speed value 225 is greater than wheel speed value 221, aircraft ground speed unit 210 may determine actual aircraft ground speed 227 to be equal to (or proportional to) reference ground speed value 225 (regardless of the detection of a non-use condition). If wheel speed value 221 is greater than or equal to reference ground speed value 225, and no non-use condition is detected by aircraft ground speed unit 210, aircraft ground speed unit 210 may determine actual aircraft ground speed 227 to be equal to (or proportional to) wheel speed value 221. If wheel speed value 221 is greater than reference ground speed value 225, and a non-use condition is detected by aircraft ground speed unit 210, aircraft ground speed unit 210 may determine actual aircraft ground speed 227 to be equal to (or proportional to) reference ground speed value 225.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of determining an actual aircraft ground speed, comprising:
   receiving, by a processor, a reference ground speed value based on a first wheel speed value from a first landing gear wheel and a second wheel speed value from a second landing gear wheel, wherein the first landing gear wheel and the second landing gear wheel are disposed on an aircraft aft of a nose wheel;
   receiving, by the processor, a wheel speed value of the nose wheel of an aircraft;
   comparing, by the processor, the wheel speed value of the nose wheel and the reference ground speed value;
   determining, by the processor, the actual aircraft ground speed based on the reference ground speed value and the wheel speed value; and
   analyzing, by the processor, for a non-use condition prior to the determining the actual aircraft ground speed, wherein the non-use condition is a condition which prevents the processor from utilizing the wheel speed value of the nose wheel to determine the actual aircraft ground speed,
   wherein the actual aircraft ground speed is determined to be at least one of equal to or proportional to the reference ground speed value in response to at least one of the reference ground speed value being greater than the wheel speed value and detecting, by the processor, existence of the non-use condition in response to the analyzing for the non-use condition,
   wherein the actual aircraft ground speed is determined to be at least one of equal to or proportional to the wheel speed value in response to the wheel speed value being greater than or equal to the reference ground speed value, and in response to detecting, by the processor, non-existence of the non-use condition in response to the analyzing for the non-use condition.

2. The method of claim 1, further comprising receiving, by the processor, a weight signal prior to the analyzing for the non-use condition, wherein the non-use condition is the weight signal indicating a lack of weight on the nose wheel.

3. The method of claim 2, wherein the non-use condition is the weight signal indicating that the lack of weight on the nose wheel caused the weight on the nose wheel to take place for less than a predetermined duration.

4. The method of claim 1, further comprising receiving, by the processor, a wheel steering angle value prior to the analyzing for the non-use condition, wherein the non-use condition is the wheel steering angle value indicating that the nose wheel is not substantially in a base position.

5. The method of claim 1, further comprising receiving, by the processor, a runway signal prior to the analyzing for the non-use condition, wherein the non-use condition is the runway signal indicating an adverse condition on the runway.

6. An aircraft ground speed determination system, comprising:
   a landing gear wheel;
   a wheel speed monitor coupled to the landing gear wheel;
   a nose wheel;
   a nose wheel speed monitor coupled to the nose wheel;
   a processor in electronic communication with the wheel speed monitor and the nose wheel speed monitor; and a tangible, non-transitory memory configured to communicate with the processor, the tangible, non-transitory memory having instructions stored thereon that, in response to execution by the processor, cause the processor to perform operations comprising:
- receiving, by the processor, a reference ground speed value based on a first wheel speed value from a first landing gear wheel and a second wheel speed value from a second landing gear wheel, wherein the first landing gear wheel and the second landing gear wheel are disposed on an aircraft aft of a nose wheel;
- receiving, by the processor, a wheel speed value of the nose wheel of an aircraft;
- comparing, by the processor, the wheel speed value of the nose wheel and the reference ground speed value;
- determining, by the processor, an actual aircraft ground speed based on the reference ground speed value and the wheel speed value; and
- analyzing, by the processor, for a non-use condition prior to the determining the actual aircraft ground speed, wherein the non-use condition is a condition which prevents the processor from utilizing the wheel speed value of the nose wheel to determine the actual aircraft ground speed,
- wherein the actual aircraft ground speed is determined to be at least one of equal to or proportional to the reference ground speed value in response to at least one of the reference ground speed value being greater than the wheel speed value and detecting, by the processor, existence of the non-use condition in response to the analyzing for the non-use condition,
- wherein the actual aircraft ground speed is determined to be at least one of equal to or proportional to the wheel speed value in response to the wheel speed value being greater than or equal to the reference ground speed value, and in response to detecting, by the processor, non-existence of the non-use condition in response to the analyzing for the non-use condition.

7. The aircraft ground speed determination system of claim 6, wherein the operations further comprise receiving, by the processor, a weight signal prior to the analyzing for the non-use condition, wherein the non-use condition is the weight signal indicating a lack of weight on the nose wheel.

8. The aircraft ground speed determination system of claim 7, wherein the non-use condition is the weight signal indicating that the lack of weight on the nose wheel caused the weight on the nose wheel to take place for less than a predetermined duration.

9. The aircraft ground speed determination system of claim 6, wherein the operations further comprise receiving, by the processor, a wheel steering angle value prior to the analyzing for the non-use condition, wherein the non-use condition is the wheel steering angle value indicating that the nose wheel is not substantially in a base position.

10. The aircraft ground speed determination system of claim 6, wherein the operations further comprise receiving, by the processor, a runway signal prior to the analyzing for the non-use condition, wherein the non-use condition is the runway signal indicating an adverse condition on the runway.

11. An aircraft, comprising:
a fuselage;
a landing gear wheel coupled to the fuselage;
a wheel speed monitor coupled to the landing gear wheel;
a nose wheel coupled to the fuselage forward of the landing gear wheel;
a nose wheel speed monitor coupled to the nose wheel;
a processor in electronic communication with the wheel speed monitor and the nose wheel speed monitor; and
a tangible, non-transitory memory configured to communicate with the processor, the tangible, non-transitory memory having instructions stored thereon that, in response to execution by the processor, cause the processor to perform operations comprising:
- receiving, by the processor, a reference ground speed value based on a first wheel speed value from a first landing gear wheel and a second wheel speed value from a second landing gear wheel, wherein the first landing gear wheel and the second landing gear wheel are disposed on an aircraft aft of a nose wheel;
- receiving, by the processor, a wheel speed value of the nose wheel of an aircraft;
- comparing, by the processor, the wheel speed value of the nose wheel and the reference ground speed value;
- determining, by the processor, an actual aircraft ground speed based on the reference ground speed value and the wheel speed value; and
- analyzing, by the processor, for a non-use condition prior to the determining the actual aircraft ground speed, wherein the non-use condition is a condition which prevents the processor from utilizing the wheel speed value of the nose wheel to determine the actual aircraft ground speed,
- wherein the actual aircraft ground speed is determined to be at least one of equal to or proportional to the reference ground speed value in response to at least one of the reference ground speed value being greater than the wheel speed value and detecting, by the processor, existence of the non-use condition in response to the analyzing for the non-use condition,
- wherein the actual aircraft ground speed is determined to be at least one of equal to or proportional to the wheel speed value in response to the wheel speed value being greater than or equal to the reference ground speed value, and in response to detecting, by the processor, non-existence of the non-use condition in response to the analyzing for the non-use condition.

12. The aircraft of claim 11, wherein the operations further comprise receiving, by the processor, a weight signal prior to the analyzing for the non-use condition, wherein the non-use condition is the weight signal indicating a lack of weight on the nose wheel.

13. The aircraft of claim 12, wherein the non-use condition is the weight signal indicating that the lack of weight on the nose wheel caused the weight on the nose wheel to take place for less than a predetermined duration.

14. The aircraft of claim 11, wherein the operations further comprise receiving, by the processor, a wheel steering angle value prior to the analyzing for the non-use condition, wherein the non-use condition is the wheel steering angle value indicating that the nose wheel is not substantially in a base position.

* * * * *